United States Patent [19]

Bennett

[11] Patent Number: 5,584,347
[45] Date of Patent: Dec. 17, 1996

[54] IMPLEMENT LINKAGE DRAFT FORCE SENSING ARRANGEMENT

[75] Inventor: John S. Bennett, Ufton, United Kingdom

[73] Assignee: Massey Ferguson Manufacturing Limited, England

[21] Appl. No.: 502,047

[22] Filed: Jul. 14, 1995

[30]  Foreign Application Priority Data

Jul. 21, 1994 [GB] United Kingdom ............... 9414688

[51] Int. Cl.$^6$ .................................. A01B 63/112
[52] U.S. Cl. .................... 172/7; 73/862.632; 73/862.57
[58] Field of Search .................... 172/7, 10, 9, 8, 172/11; 73/862.57, 862.541, 862.631, 862.632, 862.637; 37/348; 280/446.1, 449

[56]  References Cited

U.S. PATENT DOCUMENTS

| | | | |
|---|---|---|---|
| 3,246,701 | 4/1966 | Schulz | 73/862.57 X |
| 3,599,479 | 8/1971 | Kutsay | 73/862.632 X |
| 4,271,910 | 6/1981 | Schafer | 172/7 |
| 4,315,548 | 2/1982 | Nakamura et al. | 172/7 X |
| 4,456,074 | 6/1984 | Prudenziati | 172/7 |
| 4,576,053 | 3/1986 | Hatamura | 73/862.631 X |
| 4,612,995 | 9/1986 | Benedek et al. | 172/7 |
| 4,640,368 | 2/1987 | Kittle et al. | 172/7 X |
| 4,721,001 | 1/1988 | Hesse et al. | 172/7 X |
| 4,982,613 | 1/1991 | Becker | 172/7 X |
| 5,042,586 | 8/1991 | Spencer et al. | 73/862.57 X |
| 5,101,909 | 4/1992 | Vangerpen | 172/7 |
| 5,178,220 | 1/1993 | Cevolini et al. | 172/7 X |

FOREIGN PATENT DOCUMENTS 2636497  9/1989  France .

*Primary Examiner*—Terry Lee Melius
*Assistant Examiner*—Victor Batson
*Attorney, Agent, or Firm*—MacMillan, Sobanski & Todd

[57] ABSTRACT

An arrangement for sensing the draft force on a linkage such as a tractor three-point linkage comprises a backplate (12) with flexible webs (16) extending from it.

Depending from the webs (16) are spurs (18) which, at their lower end, join each other and form a rearwardly extending member (24). A bore (15) extends through the backplate (12) and rearwardly extending member (24), in which a force sensing pin (30) is received. The bracket may be made from a single casting.

10 Claims, 4 Drawing Sheets

IMPLEMENT LINKAGE DRAFT FORCE SENSING ARRANGEMENT

BACKGROUND OF THE INVENTION

The invention relates to an implement linkage draft force sensing arrangement. That is an arrangement for measuring the tensile and compressive forces applied to the implement linkage during use. It is particularly suitable for use on the top-link of a tractor three-point linkage but is more widely applicable.

Implements are almost universally connected to the rear of agricultural tractors by means of a three-point linkage which is raised and lowered hydraulically. Some form of draft force sensing is included in the system in order that the linkage can be controlled in response to the measured draft force. The draft force may be sensed either on both lower-links of the three-point linkage or on the single top-link. The simplest systems use mechanical connections to control the hydraulics, however, in recent years these have been largely superseded by electrical sensors and control electronics.

1. Description of the Prior Art

It is well known in the industry to measure the draft force using two electrical sensing pins, one for each lower link of a three-point linkage. The forces measured by the two pins vary widely as lateral forces are applied to the implement and therefore the linkage is controlled in response to the average. Such systems, however, suffer from the disadvantage that they use two sensing pins, as these are expensive, and additional processing is required.

As mentioned above, it is also known in the industry to measure draft force applied to the single top-link of the three-point linkage. It has been proposed to do so directly by using a sensing pin as a spindle to articulate the top-link on the tractor. This suffers from the disadvantages that it is difficult to demount the upper arm, the pin experiences high wear and is exposed to high forces requiring it to be of large diameter. An alternative top-link system is described in French Patent No. 89 12181 (publication no. 2 636 497). The top-link is articulated on the tractor by a rocker which is attached to the tractor at both ends by means of spindles forming bearing axes. One of the spindles takes the form of a well known electrical draft force sensing pin. However, this system still suffers from the following disadvantage. Practical engineering tolerances mean that the holes in the rocker will not be perfectly aligned with the corresponding holes in the tractor frame, so that static forces on the pins are unpredictable.

SUMMARY OF THE INVENTION

It is an aim of the present invention to provide an improved implement linkage draft force sensing arrangement.

The invention thus provides an implement linkage draft force sensing arrangement comprising:

a backplate for attachment to a vehicle or machine;

one or more flexible webs extending from said backplate; and one or more spurs extending at a first end of said spur or spurs from said flexible web or webs, said spur or spurs having means for attaching a linkage thereto;

said bracket having a bore extending therethrough, part of said bore extending through said backplate and part of said bore extending through said spur or spurs adjacent a second end of said spur or spurs, said bore having said sensing pin received therein.

The arrangement provides the advantage that draft sensing is provided with only a single sensing pin thus keeping costs down further. Additionally the sensing pin is located completely within the bracket in a location where it is not used as a spindle at a bearing axis and thus is well protected and less likely to suffer wear or accidental damage. A further significant advantage of the arrangement is that the force sensed by the draft sensing pin is substantially proportional to the force in the top link and furthermore is not affected by internal stresses within the bracket or by the unpredictable forces resulting from machining tolerances.

In a preferred embodiment of the arrangement the bracket is formed from a single piece metal casting with minimal subsequent machining. In such an embodiment the bracket is simple and cheap to construct.

Preferably the arrangement also incorporates a means by which the draft sensing pin is retained in the correct location and at the correct alignment so that it senses substantially only the top-link forces along a chosen line of action. Depending on the application for which the bracket is designed a suitable line of action may be horizontal or at an angle from horizontal of between five and forty-five degrees, e.g. fifteen degrees from horizontal or thirty degrees from horizontal.

DESCRIPTION OF THE PREFERRED EMBODIMENTS

Figure 1:
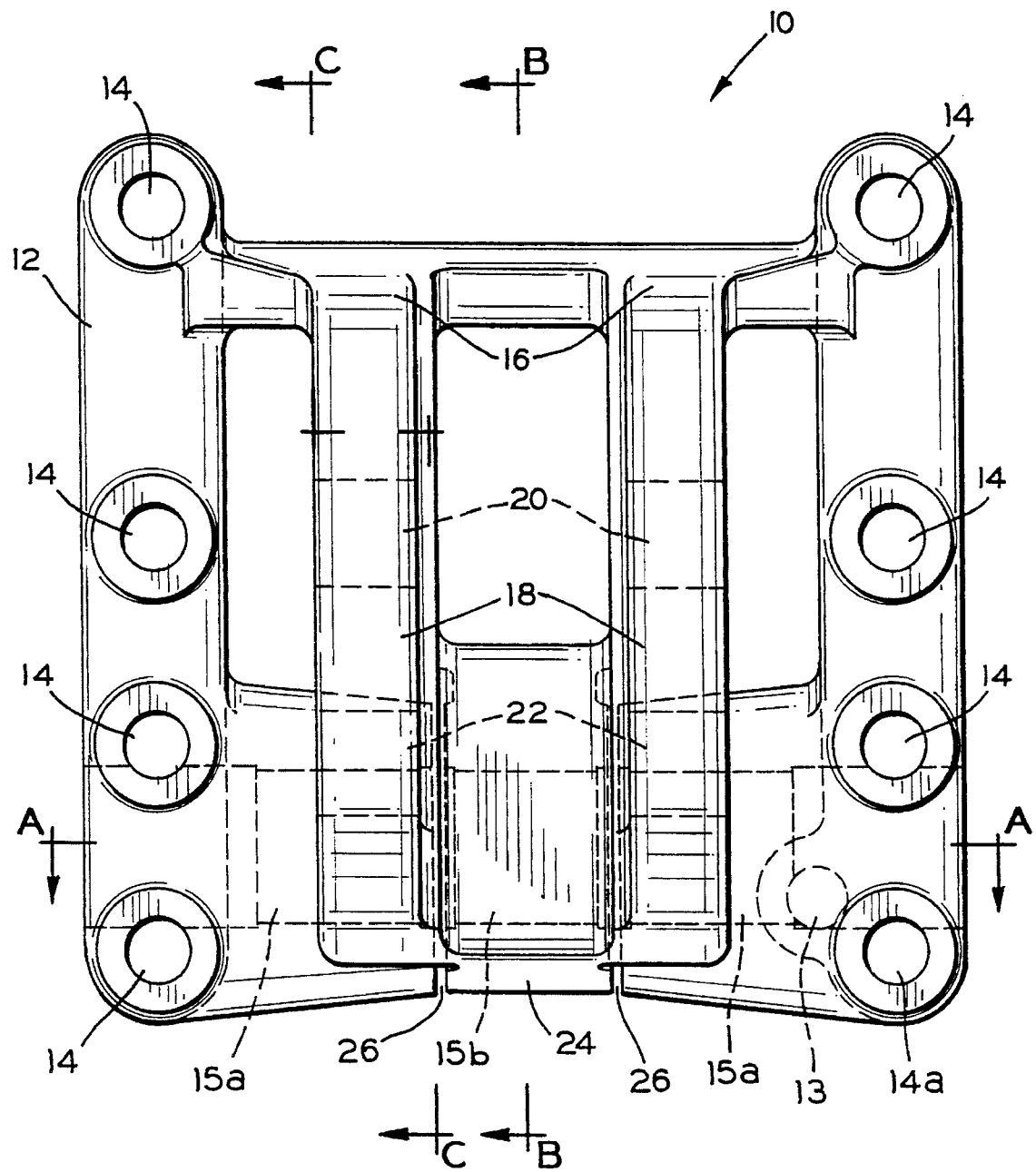
FIG. 1 shows a rear view of an top-link bracket for attachment to the tractor.
Figure 3:
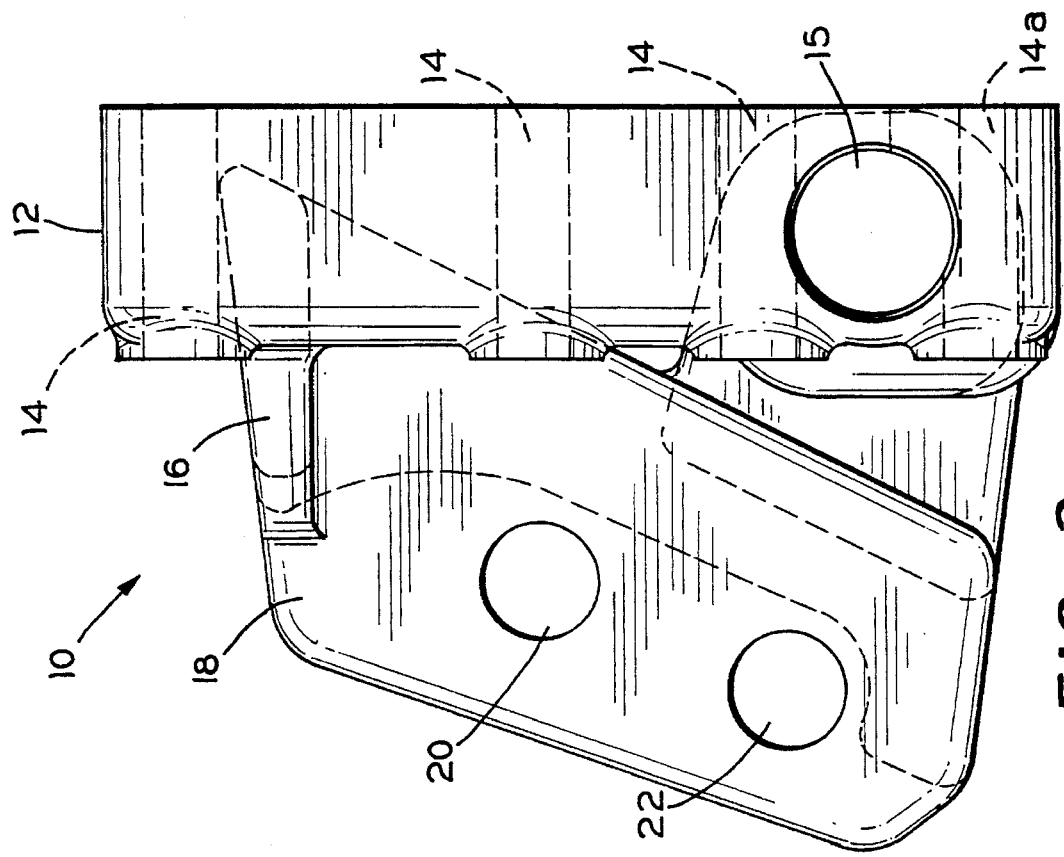
FIG. 3 shows a side view of the bracket of FIG. 1.
Figure 2:
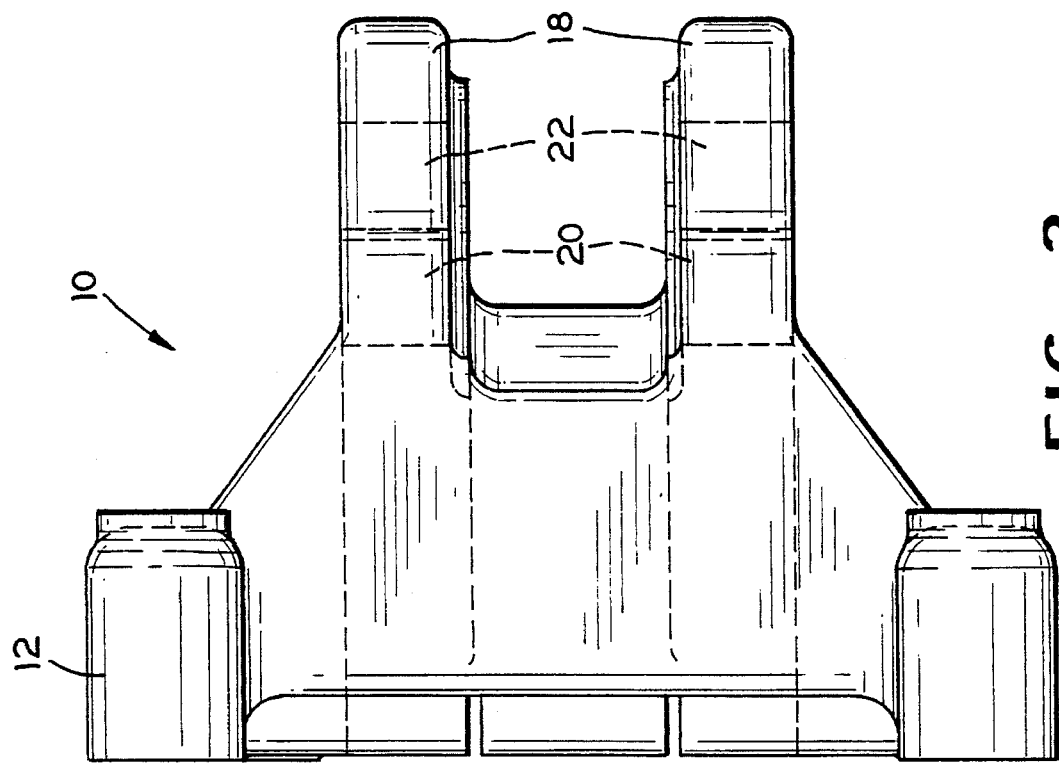
FIG. 2 shows a plan view of the bracket of FIG. 1.
Figure 5:
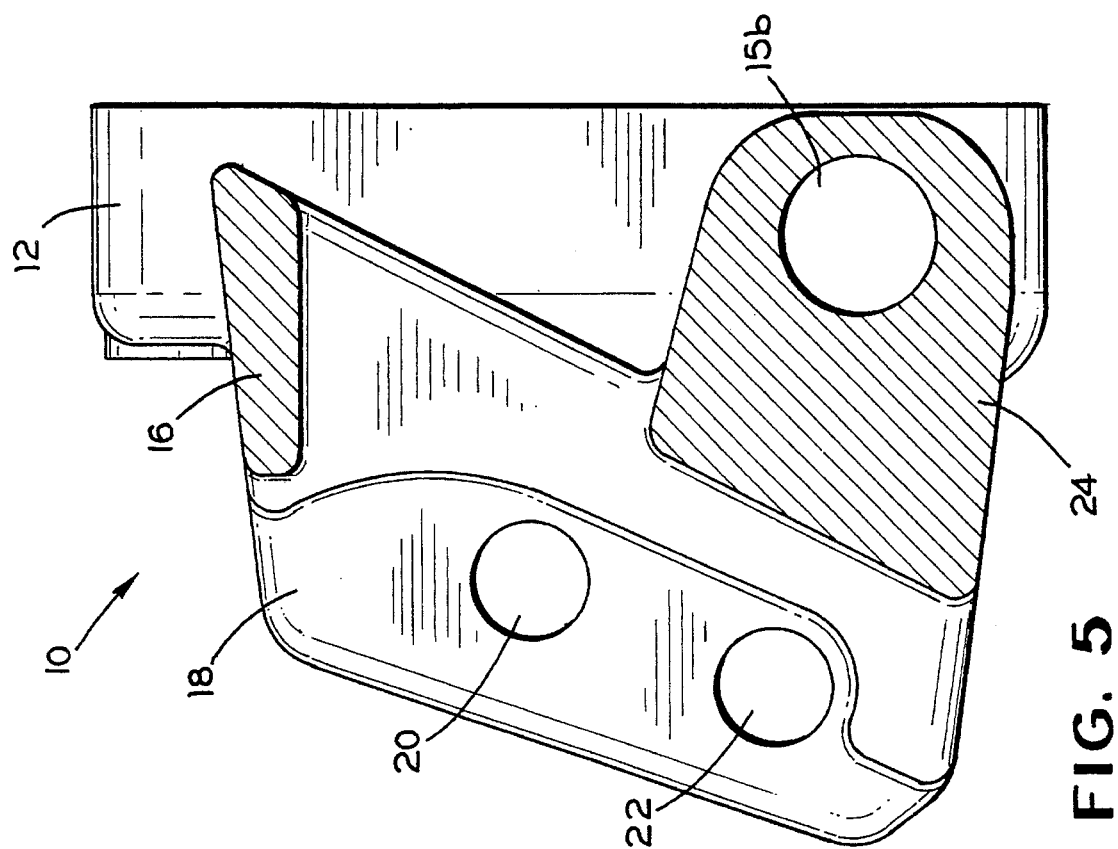
FIG. 5 shows a section through the bracket of FIG. 1 along the line B—B.
Figure 4:
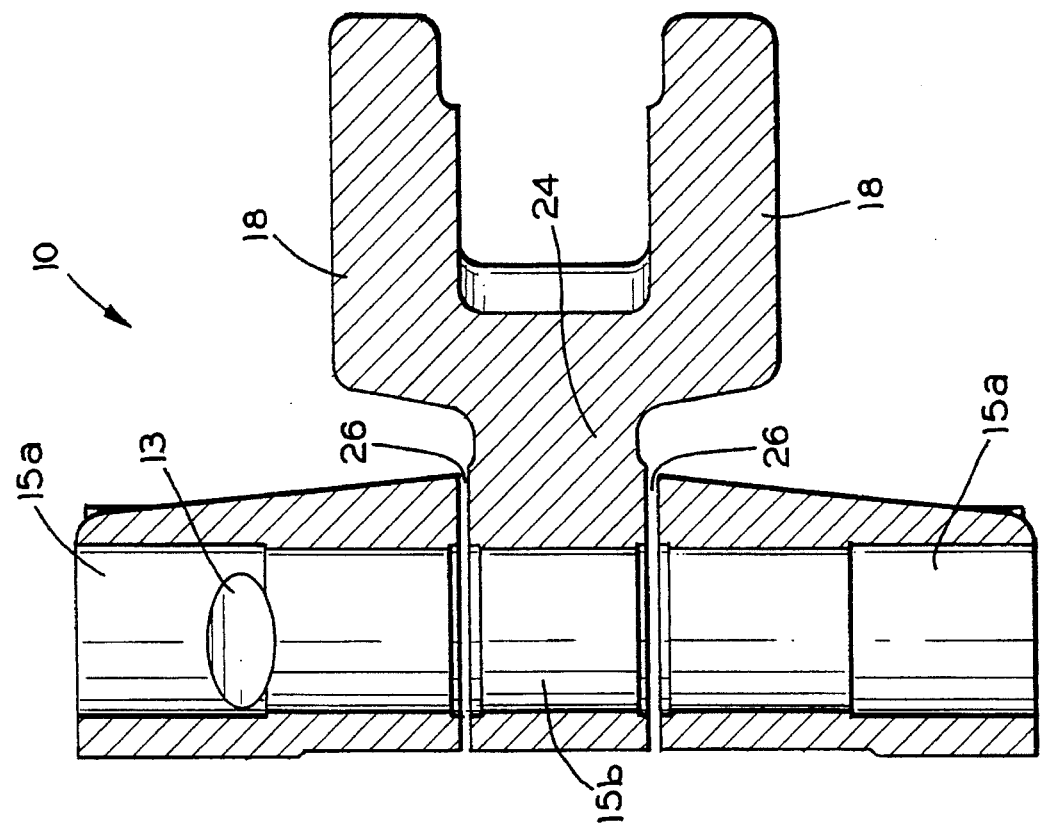
FIG. 4 shows a section through the bracket of FIG. 1 along the line A—A.

Referring to each of FIGS. 1 to 6, a top-link bracket 10 for attachment to the tractor consists of a single piece metal casting. The bracket 10 has a back plate 12 with eight bolt holes 14 through its thickness for bolting it to the tractor (not shown). Adjacent to the lower edge of the backplate 12, across the width of the backplate perpendicular to the bolt holes 14, are lateral portions 15a of a bore 15 for receiving an electrical draft force sensing pin (see FIG. 7). In addition, a small bore 13 is located adjacent and parallel to the bottom bolt hole 14a on the righthand side of the backplate and intersecting with the righthand lateral portion 15a of the bore 15 as shown most clearly in FIG. 4.

Adjacent to the upper edge of the back plate 12 two substantially horizontal webs 16 extend outwards from the backplate supporting two outwardly and downwardly projecting spurs 18. The webs 16 have the effect of joining the spurs 18 to the backplate 12, whilst still permitting a small degree of relative movement in the vertical plane through their torsional flexibility. The spurs 18 have upper and lower pairs of holes 20, 22 respectively, either of which may be used for attachment to the top-link of a three-point linkage.

At their lower ends the spurs 18 turn inwards towards the backplate 12 and come together to form a single central extension 24 through which passes the central portion 15b of the bore 15. When the bracket 10 is cast the central extension 24 is continuous with the lower edge of the backplate 12 and thus the central portion 15b of the bore 15 is continuous with the lateral portions 15a. However, after casting and subsequent machining of the bore 15 to appropriate tolerances, two slots 26 are machined in the casting such that the central extension 24 is separated from the lower edge of the backplate and central portion 15b of the bore 15 is no longer continuous with the lateral portions 15a. Alternatively, the bracket can be cast with the two slots already in place. In this event, it can be provided with a raised portion on the rear of the casting at the central bore portion 15b. This raised portion is then accurately machined to be coplanar with the remainder of the back of the casting. The casting is then held against a flat surface whilst the bore 15 is drilled, ensuring alignment between the parts of the bore.

Figure 7:
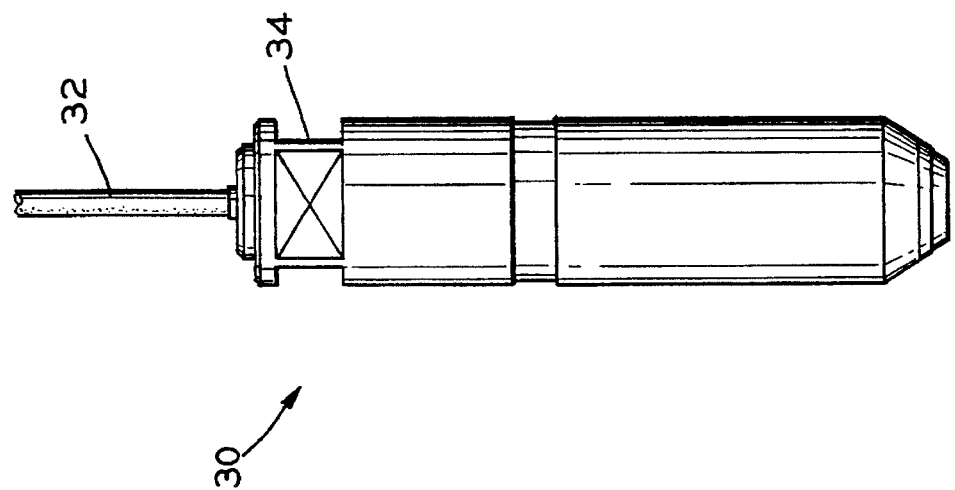
FIG. 7 shows a draft force sensing pin, of known sort, for use with the bracket of FIG. 1.
Figure 6:
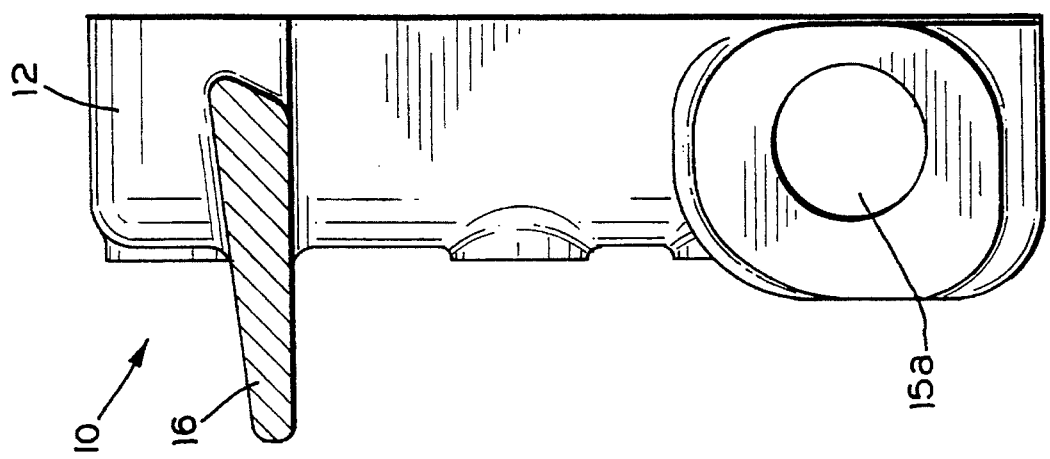
FIG. 6 shows a section through the bracket of FIG. 1 along the line C—C.

FIG. 7 shows a known form of draft force sensing pin 30 which when used with the bracket 10 is located within the bore 15 with its signal cable 32 protruding from the right hand side of the bore as viewed in FIG. 1. The sensing pin 30 has three flat surfaces 34 formed on its surface adjacent to the end to which the signal cable 32 is connected. The sensing pin 30 is retained in the correct location within the bore 15, and prevented from rotation, by insertion of a retaining pin (not shown), which has a flat surface, into the small bore 13 such that the flat surface on the retaining pin engages with one of the flat surfaces 34 on the sensing pin 30.

The sensitivity of the sensing pin 30 varies with the direction from which the force is exerted. Therefore, in order to obtain as even a response from the pin as possible it is located at such an orientation that substantially only the horizontal components of forces are measured. In order to achieve this most accurately for the upper top-link attachment hole 20 the pin should be located at an angle of 26 degrees to the horizontal, and for the lower hole 22 at an angle of 32 degrees. In use, however, it would be a considerable disadvantage to have to relocate the sensing pin 30 when changing the top-link attachment and a compromise angle of 30 degrees is used and provides very acceptable results. The location of the small bore 13 relative to the bolt hole 14a is thus selected to provide the angle of 30 degrees provided that the flat on the retaining pin is engaged with the correct one of the three flats 34 on the sensing pin.

In use with the bracket 10 bolted to a tractor, the top-link attached to either of the pairs of attachment holes 20, 22 and with an implement attached to the linkage the arrangement operates as follows. As forces are applied to the implement, and thus to the linkage, the webs 16 of the bracket 10 flex and thus forces are applied to the sensing pin 30 located in the bore 15. The pin 30 operates as is well known and the control of the implement linkage in response to the measured forces is not part of the invention and will not be described here, but it may be in one of the known manners or otherwise.

The bracket is shown in FIGS. 1 to 6 with the flexible webs 16 towards the top and the bore 15 in which the pin 30 is located towards the bottom. When used with the top-link of a tractor three-point linkage this is particularly advantageous for the following reasons. In general when using heavy implements the top-link is attached by means of the upper pair of holes 20 and when using light implements it is attached by means of the lower pair of holes 22. Thus for heavy implements the top-link is attached closer to the pin than for light implements providing greater sensitivity for the light implements as is preferable. In the prior art this is not the case with the top-link being attached closer to the pin for heavy implements than for light implements thus providing greater sensitivity for the heavy implements than for the light ones.

However, in other situations when it is appropriate the bracket 10, or other similarly designed brackets, may be used with the flexible webs towards the bottom and the bore in which the sensing pin is located towards the top. Any orientation of the bracket may be adopted as appropriate for the situation in which the arrangement is to be used.

Further, other designs of bracket may be made which still employ the same principle of operation. For instance, the two webs 16 may be replace by one or more webs of an alternative design provided that the design has sufficient flexibility to permit sufficient relative movement in the vertical plane. The bracket may also be formed in a different manner. For instance the two slots 26 may be included in the original casting rather than machined later and a lower cross piece incorporated in the back plate to make it more rigid.

What I claim is:

1. An implement linkage draft force sensing arrangement comprising a sensing pin and a bracket, said bracket comprising:

a backplate for attachment to an apparatus;

at least one flexible web extending from said backplate; and at least one spur extending at a first end of said spur from said flexible web, said spur having means for attaching a linkage thereto;

said bracket having a bore extending therethrough, part of said bore extending through said backplate and part of said bore extending through said spur adjacent a second end of said spur, said bore having said sensing pin received therein.

2. The arrangement according to claim 1 wherein said bracket is formed of a single casting.

3. The arrangement according to claim 1 wherein said parts of said bore are separated from each other by slots machined in said bracket.

4. The arrangement according to claim 2 wherein said parts of said bore are separated from each other by slots integrally cast into said bracket.

5. The arrangement according to claim 4 wherein said bracket includes means for aligning parts of said bracket through which said parts of said bore extend, whereby said parts of said bracket may be aligned when said bore is initially made so that said parts of said bore are aligned.

6. The arrangement according to claim 1 wherein said means for attaching a linkage to said spur enables a linkage to be attached at one of at least two positions which are spaced apart from one another.

7. The arrangement according to claim 1 wherein said sensing pin is oriented in said bore to sense force at an angle of between 5 and 45 degrees to the horizontal when said backplate is vertically oriented.

8. The arrangement according to claim 7 wherein the said angle is between 20 and 40 degrees.

9. The arrangement according to claim 8 wherein the said angle is between 25 and 35 degrees.

10. The arrangement according to claim 7 including retaining means for retaining said sensing pin at said angle.

* * * * *